US007965485B2

(12) United States Patent
Mosesian et al.

(10) Patent No.: US 7,965,485 B2
(45) Date of Patent: Jun. 21, 2011

(54) CIRCUIT PROTECTION DEVICE FOR PHOTOVOLTAIC SYSTEMS

(75) Inventors: Jerry L. Mosesian, Newburyport, MA (US); Jean-Francois de Palma, Arlington, MA (US)

(73) Assignee: Ferraz Shawmut S.A., St. Bonnet de Mure (FR)

( * ) Notice: Subject to any disclaimer, the term of this patent is extended or adjusted under 35 U.S.C. 154(b) by 195 days.

(21) Appl. No.: 12/483,385

(22) Filed: Jun. 12, 2009

(65) Prior Publication Data

US 2010/0315753 A1 Dec. 16, 2010

(51) Int. Cl.
*H02H 5/04* (2006.01)
*H02H 1/00* (2006.01)
*H02H 3/08* (2006.01)
*H02H 9/02* (2006.01)

(52) U.S. Cl. ........................ 361/104; 361/93.1; 361/124

(58) Field of Classification Search .................. 361/104, 361/124

See application file for complete search history.

(56) References Cited

U.S. PATENT DOCUMENTS 2,293,953 A 8/1942 Taylor .......................... 200/123
2,789,181 A 4/1957 Baenziger ..................... 200/123
3,453,580 A 7/1969 Withers ........................ 337/221
3,855,563 A 12/1974 Cameron et al. .............. 337/221
3,964,010 A 6/1976 Tasuku .......................... 337/148
4,032,877 A 6/1977 McAlister ...................... 337/148
4,184,137 A 1/1980 Gaia et al. ..................... 337/161
4,401,965 A 8/1983 Backlund et al. ............. 337/408
4,580,090 A 4/1986 Bailey et al. .................. 323/303
4,581,540 A 4/1986 Guarjardo ..................... 307/117
4,931,778 A 6/1990 Guajardo ...................... 340/664
5,231,367 A * 7/1993 Ikeda et al. ..................... 337/28
5,245,308 A 9/1993 Herbias ......................... 337/273
5,515,023 A 5/1996 Marach et al. ................ 337/213
5,523,916 A 6/1996 Kaczmarek ................... 361/119
5,725,062 A 3/1998 Fronek .......................... 180/2.2
5,805,046 A 9/1998 Hassler et al. ................ 337/168
5,831,507 A * 11/1998 Kasamatsu et al. ............... 337/4
5,841,337 A 11/1998 Douglass ...................... 337/198
5,847,593 A 12/1998 Pernyeszi ...................... 327/432
6,040,971 A 3/2000 Martenson et al. ........... 361/118
6,054,915 A 4/2000 Rowton et al. ................ 337/216
6,157,287 A 12/2000 Douglass et al. ............. 337/198
6,256,183 B1 * 7/2001 Mosesian ...................... 361/104
6,310,789 B1 10/2001 Nebrigic et al. ................ 363/60
6,370,046 B1 4/2002 Nebrigic et al. ................ 363/60
6,430,019 B1 * 8/2002 Martenson et al. ........... 361/124
6,567,759 B2 5/2003 Dollar, II ........................ 702/58

(Continued)

*Primary Examiner* — Dharti H Patel
(74) *Attorney, Agent, or Firm* — Kusner & Jaffe

(57) ABSTRACT

A circuit protection device for protecting a photovoltaic (PV) system from an overcurrent condition. The circuit protection device includes a first electrode electrically connectable to a first line of an electrical circuit, a second electrode electrically connectable to a second line of the electrical circuit. A first thermal element, second thermal element and an overload assembly define a first conductive path between the first and second electrodes. A bypass shunt defines a second conductive path between the first and second electrodes. The overload assembly electrically connects the first thermal element to the second thermal element, and is moveable between a closed position and an open position (i.e., overload condition). A low melt temperature solder electrically connects the overload assembly to the second thermal element. The low melt temperature solder softens and melts as the temperature increases in response to an overcurrent condition. Consequently, overload assembly moves from the closed position to the open position, thereby opening the first conductive path between the first and second electrodes. Residual follow-on current flows through bypass shunt via the second conductive path until the bypass shunt melts.

21 Claims, 9 Drawing Sheets

U.S. PATENT DOCUMENTS

| | | | | |
|---|---|---|---|---|
| 6,633,824 | B2 | 10/2003 | Dollar, II | 702/58 |
| 6,879,053 | B1 | 4/2005 | Welches et al. | 290/6 |
| 7,000,395 | B2 | 2/2006 | Wai et al. | 60/698 |
| 7,059,898 | B2 | 6/2006 | Barile | 439/532 |
| 7,239,044 | B1 | 7/2007 | Atcitty et al. | 307/66 |
| 7,330,098 | B2 | 2/2008 | Yoshikawa | 337/416 |
| 7,385,518 | B2 | 6/2008 | Torrez et al. | 340/638 |
| 2004/0010350 | A1 | 1/2004 | Lof et al. | 700/292 |
| 2005/0007071 | A1 | 1/2005 | Colberg et al. | 320/119 |
| 2005/0088868 | A1 | 4/2005 | Ryan et al. | 365/65 |
| 2006/0055498 | A1 | 3/2006 | Darr et al. | 337/143 |
| 2006/0125596 | A1 | 6/2006 | Darr et al. | 337/194 |
| 2006/0227472 | A1 | 10/2006 | Taylor et al. | 361/42 |
| 2007/0107767 | A1 | 5/2007 | Hayden et al. | 136/244 |
| 2007/0139850 | A1 | 6/2007 | Kamel et al. | 361/124 |
| 2007/0164612 | A1 | 7/2007 | Wendt et al. | 307/45 |
| 2007/0285865 | A1 | 12/2007 | McLoughlin et al. | 361/118 |
| 2008/0111517 | A1 | 5/2008 | Pfeifer et al. | 320/101 |
| 2008/0130180 | A1 | 6/2008 | de Palma et al. | 361/56 |
| 2008/0203820 | A1 | 8/2008 | Kramer et al. | 307/64 |

* cited by examiner

CIRCUIT PROTECTION DEVICE FOR PHOTOVOLTAIC SYSTEMS

FIELD OF THE INVENTION

The present invention relates generally to circuit protection devices, and more particularly to a device that provides circuit protection for photovoltaic systems.

BACKGROUND OF THE INVENTION

Common types of solar installations for generating electricity from solar energy systems include a stand-alone solar array with a back-up generator set, and a grid-connected system. A typical solar installation is generally comprised of a photovoltaic (PV) array, a combiner box, a DC/AC inverter, and a main electrical panel. The PV array is comprised of a plurality of PV modules that capture sunlight as direct current (DC). The PV modules are commonly connected into an electrical string to produce the desired voltage and amperage. The resulting wires from each string are routed to the combiner box. The electric output wires of the PV modules are wired together in the combiner box in order to get the voltage and current required by the DC/AC inverter. The DC/AC inverter converts direct current (DC) into alternating current (AC) that is provided to the main electrical panel. A DC disconnect switch is provided to disconnect the combiner box from the input of the DC/AC inverter, and an AC disconnect switch is provided to disconnect the main electrical panel from the output of the DC/AC inverter. In a typical solar installation, circuit protection devices are found in the combiner box, the DC/AC inverter and the main electrical panel.

Generating electricity from solar energy is generally a reliable process. However, any type of solar power generation system is vulnerable to fault currents or lightning. Circuit protection devices (e.g. fuses and surge protective devices) are effective ways of protecting the wiring and electrical equipment in a PV system. For example, fuses are used to protect cables between strings of modules from overcurrent damage. The faulty circuits are isolated allowing the PV system to continue generating power.

The continued development of PV systems has created a growing use of fuses to provide overcurrent protection for equipment and conductors (e.g., cables) associated with generation and distribution of solar power. While PV systems are designed to achieve maximum efficiency, fuses typically have power losses ranging from a few watts to near 10 watts. Accordingly, there is a need for a circuit protection device having lower power losses in order to provide higher efficiency in PV systems.

The present invention provides a circuit protection device that provides improved power efficiency in PV systems.

SUMMARY OF THE INVENTION

In accordance with the present invention, there is provided a circuit protection device for protecting an electrical circuit from an overcurrent condition. The device includes a first electrode electrically connectable to a first line of the electrical circuit; a second electrode electrically connectable to a second line of the electrical circuit; a first thermal element electrically connected with the first electrode; a second thermal element electrically connected with the second electrode; an overload assembly; and a bypass shunt. The overload assembly electrically connects the first thermal element with the second thermal element, and is moveable between an open position and a closed position. The first thermal element, second thermal element and overload assembly define a first conductive path between the first and second electrode. A low melt temperature solder electrically connects the overload assembly to the second thermal element. The low melt temperature solder softens and melts as the temperature increases in response to an overcurrent condition. The bypass shunt is electrically connected with the first and second electrodes, and defines a second conductive path between the first and second electrodes, wherein the second conductive path is parallel to the first conductive path.

It is an object of the present invention to provide a circuit protection device for PV systems that reduces power loss, thereby improving power efficiency.

It is another object of the present invention to provide a circuit protection device for PV systems that allows convenient plug-type replacement.

A further object of the present invention is to provide a circuit protection device for PV systems, wherein the device has dimensions suitable for use in multi-pole applications.

These and other objects and advantages will become apparent from the following description of preferred embodiments of the present invention, taken together with the accompanying drawings.

BRIEF DESCRIPTION OF THE DRAWINGS

The invention may take physical form in certain parts and arrangement of parts, an embodiment of which will be described in detail in the specification and illustrated in the accompanying drawings which form a part hereof, and wherein.

DETAILED DESCRIPTION OF PREFERRED EMBODIMENT

Figure 1:
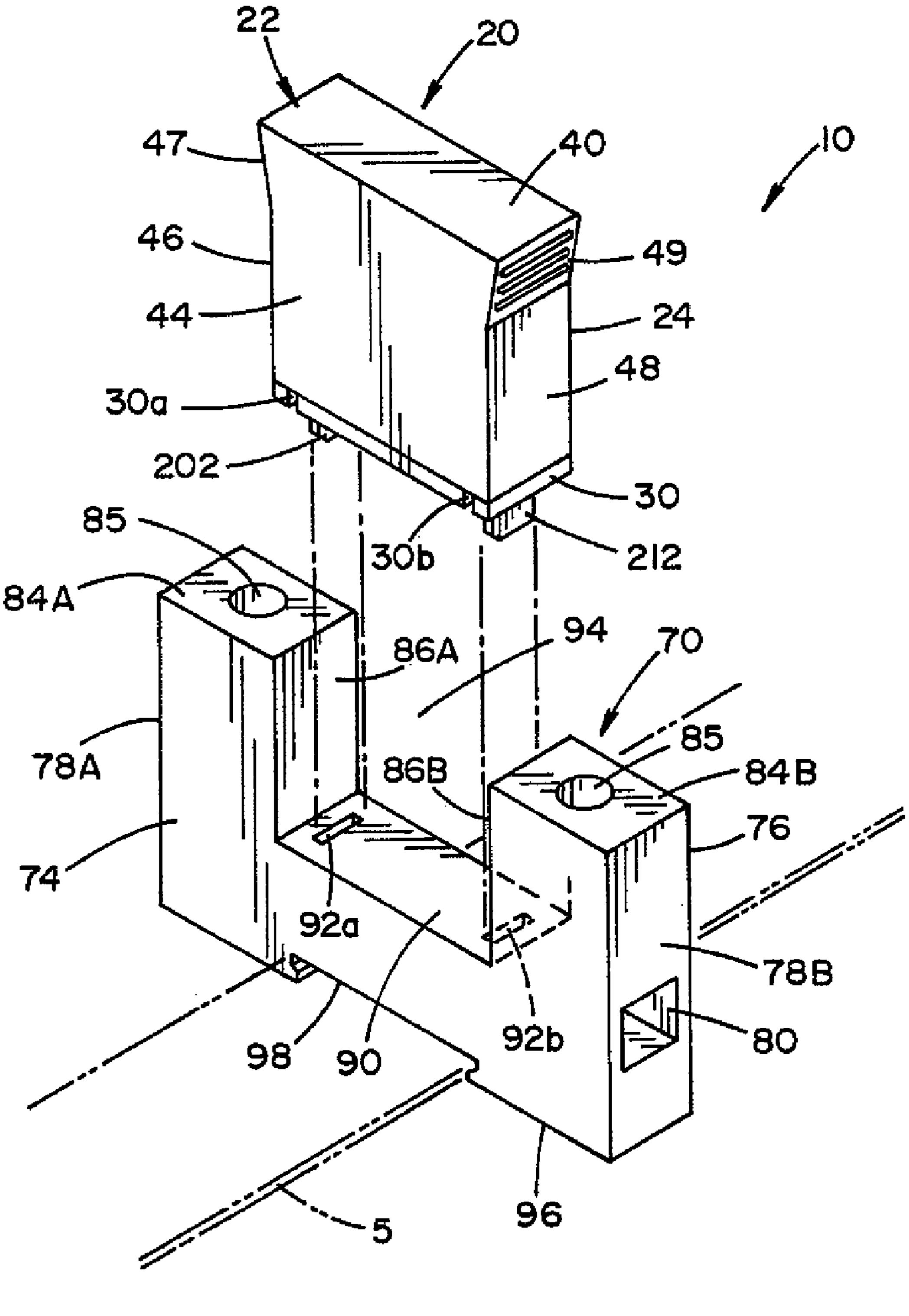
FIG. 1 is an exploded perspective view of an assembly including a circuit protection device and a holder, according to an embodiment of the present invention.

Referring now to the drawings wherein the showings are for the purpose of illustrating a preferred embodiment of the invention only, and not for the purpose of limiting same, FIG. 1 is an exploded perspective view of a fuse assembly 10 including a circuit protection device 20 and a fuse mount or holder 70, according to an embodiment of the present invention.

Figure 2:
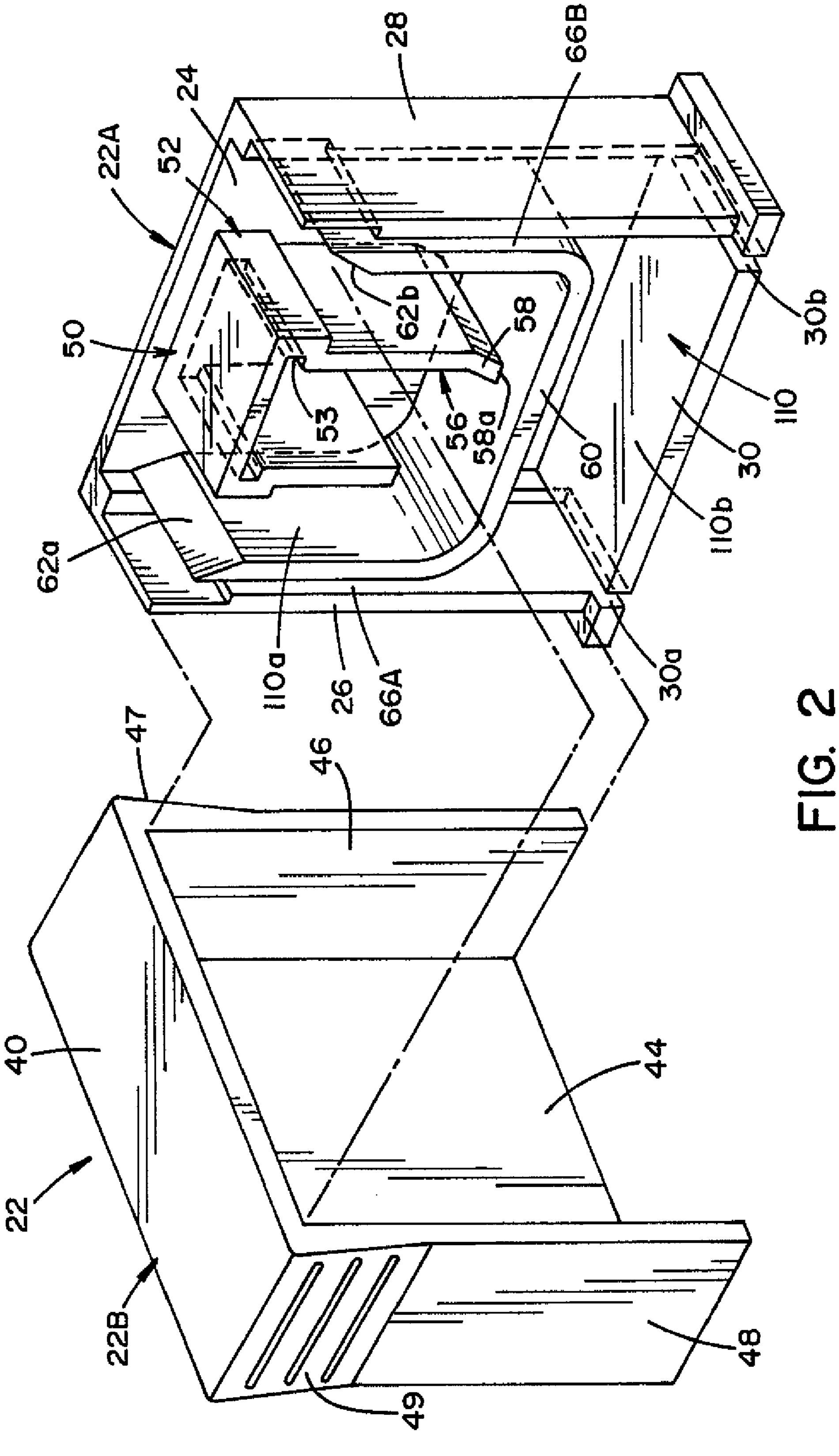
FIG. 2 is an exploded perspective view of a housing of the circuit protection device shown in FIG. 1.

Circuit protection device 20 is comprised of components (described below) for protecting PV systems from overcurrent conditions. The operative components are contained within a generally rectangular housing 22 comprised of a generally rectangular-shaped base section 22A and a mating, generally rectangular-shaped cover section 22B, as best seen in FIG. 2. Base section 22A is adapted to receive and hold the operative components of circuit protection device 20. To this end, base section 22A includes a generally planar bottom wall 30, a rear wall 24 and opposed side walls 26, 28. An enclosure 50 and a U-shaped divider wall 60 extend from rear wall 24. Enclosure 50 includes an upper section 52 and an elongated leg section 56. Upper section 52 defines a slot 53. Leg section 56 includes an inwardly bent portion 58 having a face 58*a*. Leg section 56 acts as a shield to prevent short circuiting, as will be described below. Divider wall 60 is provided to define two separate compartments or regions 110*a*, 110*b* within housing 22. Divider wall 60 includes sloped surfaces 62*a*, 62*b*. A pair of slots 30*a* and 30*b* formed in bottom wall 30 are respectively aligned with a pair of slots 66A and 66B defined by divider wall 60 and side walls 26, 28.

Figure 3:
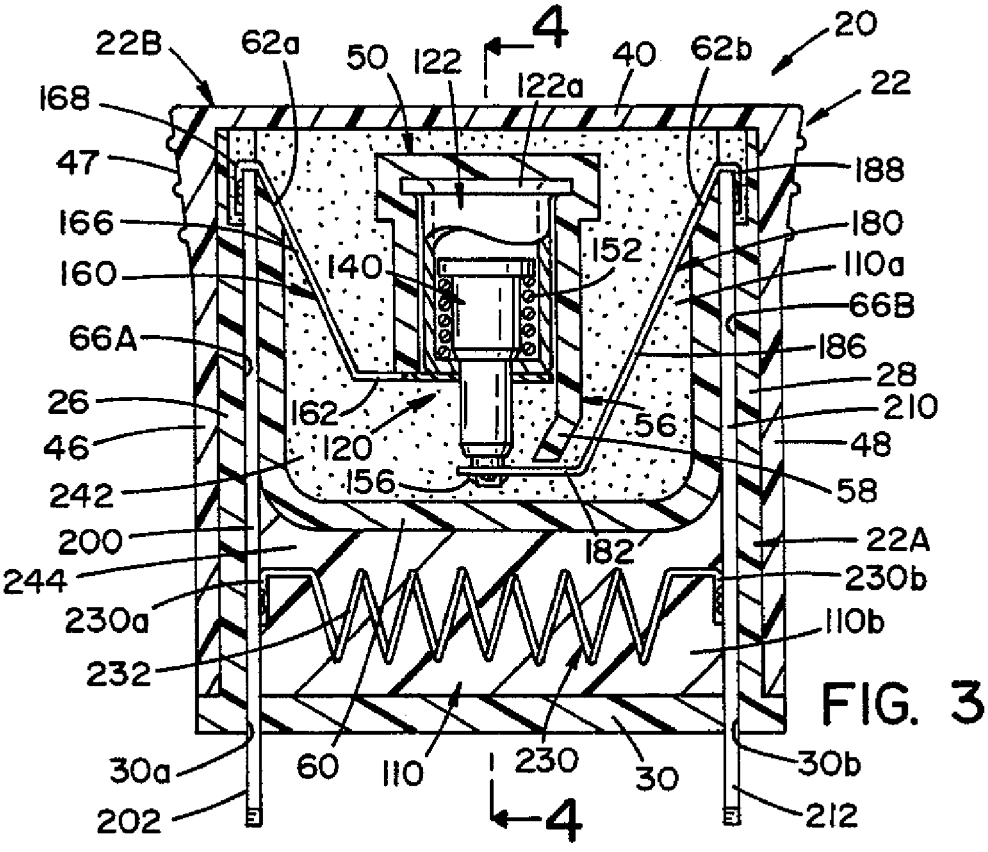
FIG. 3 is a cross-sectional view of the circuit protection device of FIG. 1, the circuit protection device including an overload assembly shown in a closed circuit position.
Figure 4:
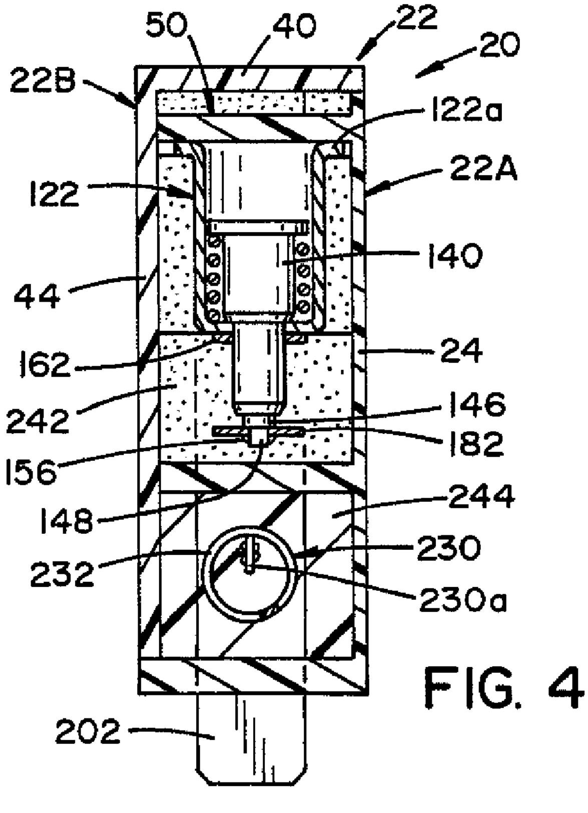
FIG. 4 is a cross-sectional view, taken along lines 4-4 of FIG. 3.

Cover section 22B includes a generally planar top wall 40 and a generally U-shaped structure comprised of a front wall 44 and opposed side walls 46 and 48. Side walls 46 and 48 include respective tapered portions 47 and 49 having ribs formed in the outer surface thereof. The ribs facilitate gripping of housing 22. To assemble housing 22, cover section 22B is secured to base section 22A in snap lock fashion or by ultrasonic welding, as is conventionally known. When housing 22 is assembled, side walls 26, 28 of base section 22A are parallel to side walls 46, 48 of cover section 22B, rear wall 24 of base section 22A is opposed and parallel to front wall 44 of cover section 22B, and bottom wall 30 of base section 22A is opposed and parallel to top wall 40 of cover section 22B, as best seen in FIGS. 1 and 3-4. It is contemplated that housing 22 may include an opening or window (not shown) to allow the operative components of circuit protection device 20 to be viewed through housing 22. Housing 22 is preferably made of a polymer material, such as FR550 Rynite® from DuPont. In one embodiment of the present invention, assembled housing 22 has a height of about 1.65 inches, a width of about 1.49 inches, and a depth of about 0.63 inches.

Holder 70 receives circuit protection device 20 and electrically connects circuit protection device 20 to an electrical circuit, as will be described below. Holder 70 is generally comprised of a U-shaped front wall 74, a U-shaped rear wall 76, a pair of side walls 78A, 78B, top wall portions 84A, 84B, side portions 86A, 86B, and center wall portion 90, as shown in FIG. 1. Top wall portions 84A, 84B, side portions 86A, 86B, and center wall portion 90 define an opening 94 dimensioned to receive circuit protection device 20.

An opening 80, leading to an internal cavity of holder 70, is formed in side wall 78B. The internal cavity is dimensioned to receive a conventional terminal connector (not shown) that includes a pair of fuse clips. A pair of holes 85 formed in top wall portions 84A and 84B are dimensioned to receive wire binding screws for holding the terminal connector within the internal cavity of holder 70. Center wall portion 90 includes a pair of slots 92*a*, 92*b* dimensioned to receive electrodes (described below) of circuit protection device 20. The electrodes of circuit protection device 20 electrical connect with the terminal connector located in the internal cavity of holder 70.

In the illustrated embodiment, a channel 98 is formed in bottom wall portion 96, and is dimensioned to receive a conventional 35 mm DIN rail 5, thereby allowing holder 70 to be mounted to a DIN rail assembly (not shown). It is contemplated that circuit protection device 22 may be "ganged" for multi-pole applications.

The components of circuit protection device 20 located within housing 22 will now be described with reference to FIGS. 3-5. FIGS. 3 and 4 show an interior cavity 110 of housing 22 comprised of base section 22A and cover section 22B. As discussed above, divider wall 60 separates interior cavity 110 into upper and lower regions 110*a*, 110*b*.

The operative components of circuit protection device 20 include an overload assembly 120, first and second thermal elements 160 and 180, first and second electrodes 200 and 210, and a bypass shunt 230.

Figure 5:
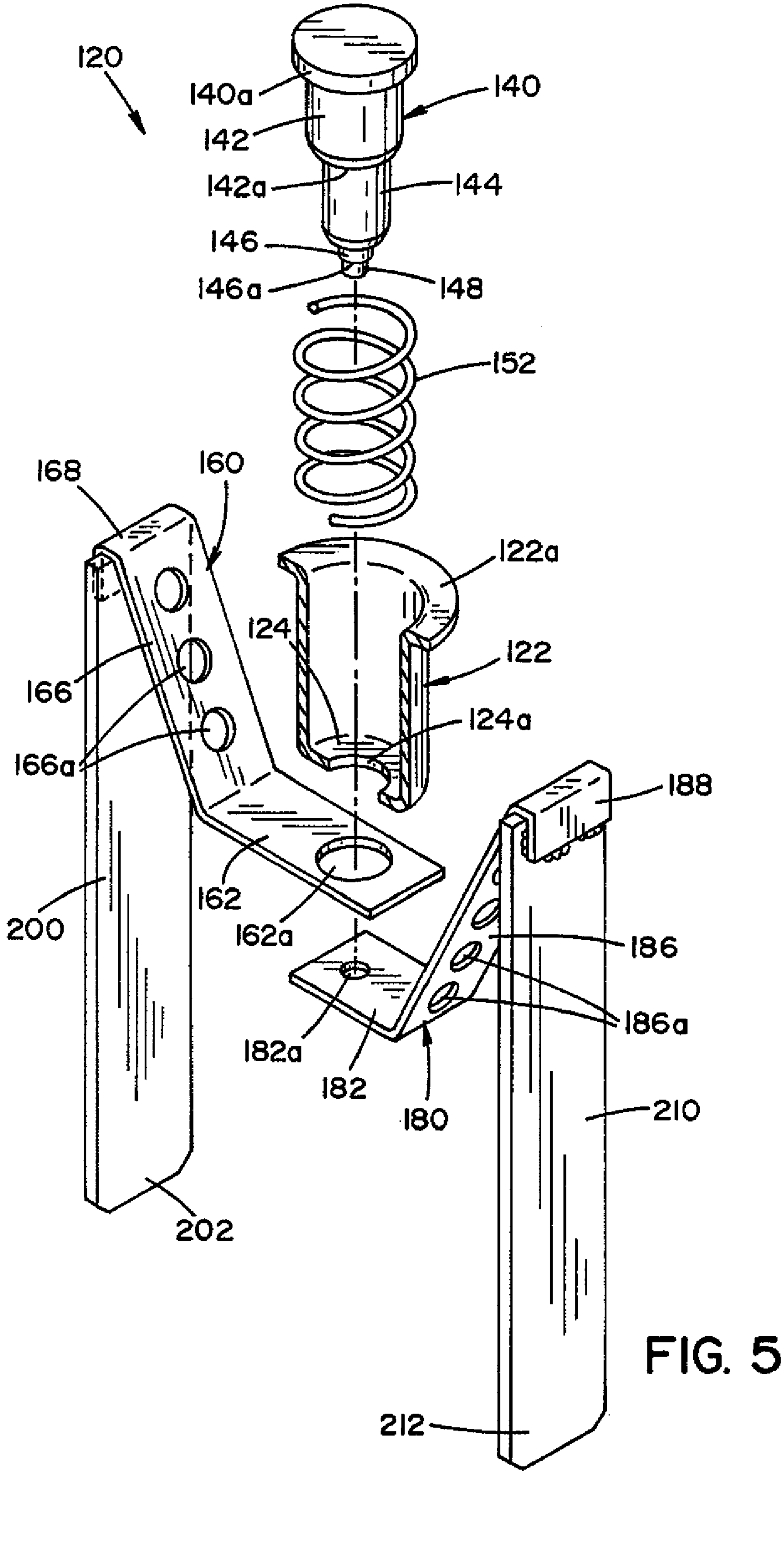
FIG. 5 is an exploded perspective view of the overload assembly of the circuit protection device.

An exploded view of overload assembly 120 according to one embodiment of the present invention is shown in FIG. 5. Overload assembly 120 is generally comprised of a cup 122, a generally cylindrical metal pin 140, and a biasing element 152. Overload assembly 120 electrically connects first thermal element 160 with second thermal element, and acts as a switch member movable between a closed position and an open position (i.e., overload condition), as will be described in detail below. It is contemplated that overload assembly 120, moveable between a closed and open position, may take the form of an alternative type of switch member.

Cup 122 includes an annular flange portion 122*a* and a bottom wall 124. A circular opening 124*a* is formed in bottom wall 124. Cup 122 is made of a conductive material (e.g., metal), and is dimensioned to receive pin 140 and biasing element 152, as will be explained in further detail below. In the illustrated embodiment, biasing element 152 takes the form of a metal compression spring.

Pin 140 includes an annular flange portion 140*a* and a body section comprised of a first cylindrical portion 142, a second cylindrical portion 144, a third cylindrical portion 146 and a fourth cylindrical portion 148. The outer diameters of each cylindrical portion 142, 144, 146 and 148 are progressively smaller, as best seen in FIG. 5. An axially-facing annular surface 142*a* is defined between first cylindrical portion 142 and second cylindrical portion 144. An axially-facing annular surface 146*a* is formed between third cylindrical portion 146 and fourth cylindrical portion 148.

First thermal element 160 is comprised of an end portion 162, an intermediate portion 166 and an L-shaped coupling portion 168. A circular opening 162*a* is formed in end portion 162. Opening 162*a* has a diameter that is smaller than the outer diameter of cylindrical portion 142, but larger than the outer diameter of second cylindrical portion 144 of pin 140, whereby movement of cylindrical portions 144, 146 and 148 through opening 162*a* is unimpeded. A plurality of holes 166*a* are formed in intermediate portion 166. In one embodiment, holes 166*a* have a diameter of about 0.031 inches, and have centers that are uniformly spaced at intervals of about 0.25 inches. Holes 166*a* reduce the area for the current path, thereby limiting the current carrying capacity of first thermal element 160. In one embodiment of the present invention, the reduced area limits the current when exposed to fault currents in excess of 10 times the nominal steady state rating of circuit protection device 20. L-shaped coupling portion 168 is dimensioned to receive a first end of first electrode 200.

First electrode 200 is an elongated, generally planar plate disposed in slot 66A. The first end of first electrode 200 is electrically connected with first thermal element 160, and a second end of first electrode 200 extends outside of housing 22 through slot 30*a* formed in bottom wall 30, as best seen in FIGS. 3 and 4. The section of first electrode 200 extending outside housing 22 provides a first blade terminal 202.

Second thermal element 180 is comprised of an end portion 182, an intermediate portion 186 and an L-shaped coupling portion 188. A circular opening 182*a* is formed in end portion 182. Opening 182*a* has a diameter that is smaller than the outer diameter of cylindrical portion 146, but larger than the outer diameter of cylindrical portion 148 of pin 140, whereby movement of cylindrical portion 148 through opening 182*a* is unimpeded. A plurality of holes 186*a* are formed in intermediate portion 186. In one embodiment, holes 186*a* have a diameter of about 0.031 inches, and have centers that are uniformly spaced at intervals of about 0.25 inches. Like holes 166*a* of first thermal element 160, holes 186*a* also reduce the area for the current path, thereby limiting the current carrying capacity of second thermal element 180. In one embodiment of the present invention, the reduced area limits the current when exposed to fault currents in excess of 10 times the nominal steady state rating of circuit protection device 20. L-shaped coupling portion 188 is dimensioned to receive a first end of second electrode 210.

Second electrode 210 is an elongated, generally planar plate disposed in slot 66B. The first end of second electrode 210 is electrically connected with second thermal element 180, and a second end of second electrode 210 extends outside of housing 22 through slot 30*b* formed in bottom wall 30, as best seen in FIGS. 3 and 4. The section of second electrode 210 extending outside housing 22 provides a second blade terminal 212.

First and second thermal elements 160, 180 are preferably made of an electrically conductive material such as a copper alloy (e.g., phosphorous bronze). In one embodiment of the present invention, first and second thermal elements 160, 180 have a width of about 0.250 inches and have a thickness of about 0.009 inches. First and second electrodes 200, 210 are preferably made of copper. In one embodiment of the present invention, first and second electrodes 200, 210 have dimensions of about 0.125 inches (thickness) by about 0.375 inches (width).

In the illustrated embodiment, bypass shunt 230 is a coiled wire 232, preferably made of manganin or nichrome. Bypass shunt 230 provides a conductive path between first electrode 200 and second electrode 210. In one embodiment of the present invention, bypass shunt 230 has a current rating in the range of about 5 A to about 15 A, and more preferably in the range of about 10 A to about 15 A.

Assembly of circuit protection device 20 will now be described in detail with reference to FIGS. 2-5. In one embodiment of the present invention, overload assembly 120, first and second thermal elements 160 and 180, first and second electrodes 200, 210 and bypass shunt 230 are pre-assembled before insertion into interior cavity 110 of housing 22. First, coupling portion 168 of first thermal element 160 and coupling portion 188 of second thermal element 180 are respectively soldered to first and second electrodes 200, 210. A high temperature, metallic solder such as silver, lead or alloys is used to attach first and second electrodes 200, 210 to first thermal element 160 and second thermal element 180.

Pre-assembly of circuit protection device 20 further comprises positioning first and second electrodes 200, 210 relative to each other such that thermal elements 160, 180 are spaced apart, as shown in FIG. 5. With first and second electrodes 200, 210 in this position, the outer surface of bottom wall 124 of cup 122 is attached to the upper surface of end portion 162 of first thermal element 160. Circular opening 124*a* of bottom wall 124 is aligned concentrically with circular opening 162*a*. Resistance welding, brazing or a high temperature solder alloy having a melt temperature greater than about 180° C. (such as a 40% tin/lead alloy) is used to attach cup 122 to first thermal element 160. Biasing element 152 is mounted onto pin 140, and pin 140 is then inserted through opening 124*a* of bottom wall 124. Biasing element 152 is compressed such that at least third cylindrical portion 146 of pin 140 extends through opening 162*a* in end portion 162 of first thermal element 160. Fourth cylindrical portion 148 of pin 140 is inserted through opening 182*a* of end portion 182 of thermal element 180, and annular surface 146*a* of third cylindrical portion 146 contacts the upper surface of end portion 182.

A solder 156 having a low melting temperature is used to attach annular surface 146*a* of pin 140 to end portion 182 of second thermal element 180. Solder 156 is preferably formed of a material that has a relatively low softening temperature or melting temperature. A melting temperature, metal alloy or a polymer having a low softening temperature may be used. The solder material is preferably a solid at room temperature (25° C.), and is a solid up to temperatures around 65° C. Preferably, solder material has a melting temperature or a softening temperature in the range of about 70° C. and about 150° C., more preferably in the range of about 125° C. and about 145° C., and even more preferably in the range of about 134° C. and 145° C. Most preferably, the solder material is comprised of an eutectic alloy, such as a Sn/Bi alloy having a melting or softening temperature of about 134° C.

Pre-assembly further includes respectively soldering first and second ends 230*a*, 230*b* of bypass shunt 230 to first and second electrodes 200 and 210. A high temperature, metallic solder such as silver, lead or alloys is used to attach first and second electrodes 200, 210 to bypass shunt 230.

Assembled overload assembly 120, first and second thermal elements 160 and 180, first and second electrodes 200, 210 and bypass shunt 230 are then disposed within base section 22A (FIG. 1) of housing 22 as shown in FIG. 3. First and second electrodes 200, 210 are respectively located within slots 66A, 30*a* and 66B, 30*b* and biasing element 152 is compressed, as illustrated in FIGS. 3 and 4. Sloped surfaces 62*a* and 62*b* respectively provide support for first and second thermal elements 160 and 180.

In one embodiment of the present invention, overload assembly 120 and first and second thermal elements 160, 180 are surrounded by an arc-quenching media 242 that is disposed within upper region 110*a* of interior cavity 110, and bypass shunt 230 is surrounded by an arc-quenching media 244 that is disposed within lower region 110*b* of interior cavity 110. The arc-quenching media may take the form of materials, including but not limited to, silicates (e.g., quartz sand), silicone materials, thermoplastic polyamide polymers, and polymerized fatty acids. In the illustrated embodiment, arc-quenching media 242 in upper region 110*a* is silica quartz sand, and arc-quenching media 244 in lower region 110*b* is an RTV (Room Temperature Vulcanizing) silicone sealant.

To complete assembly of circuit protection device 20, cover section 22*b* of housing 22 is attached to base section 22*a* of housing 22 to lock the operative components in relative position within cavity 110.

Figure 7:
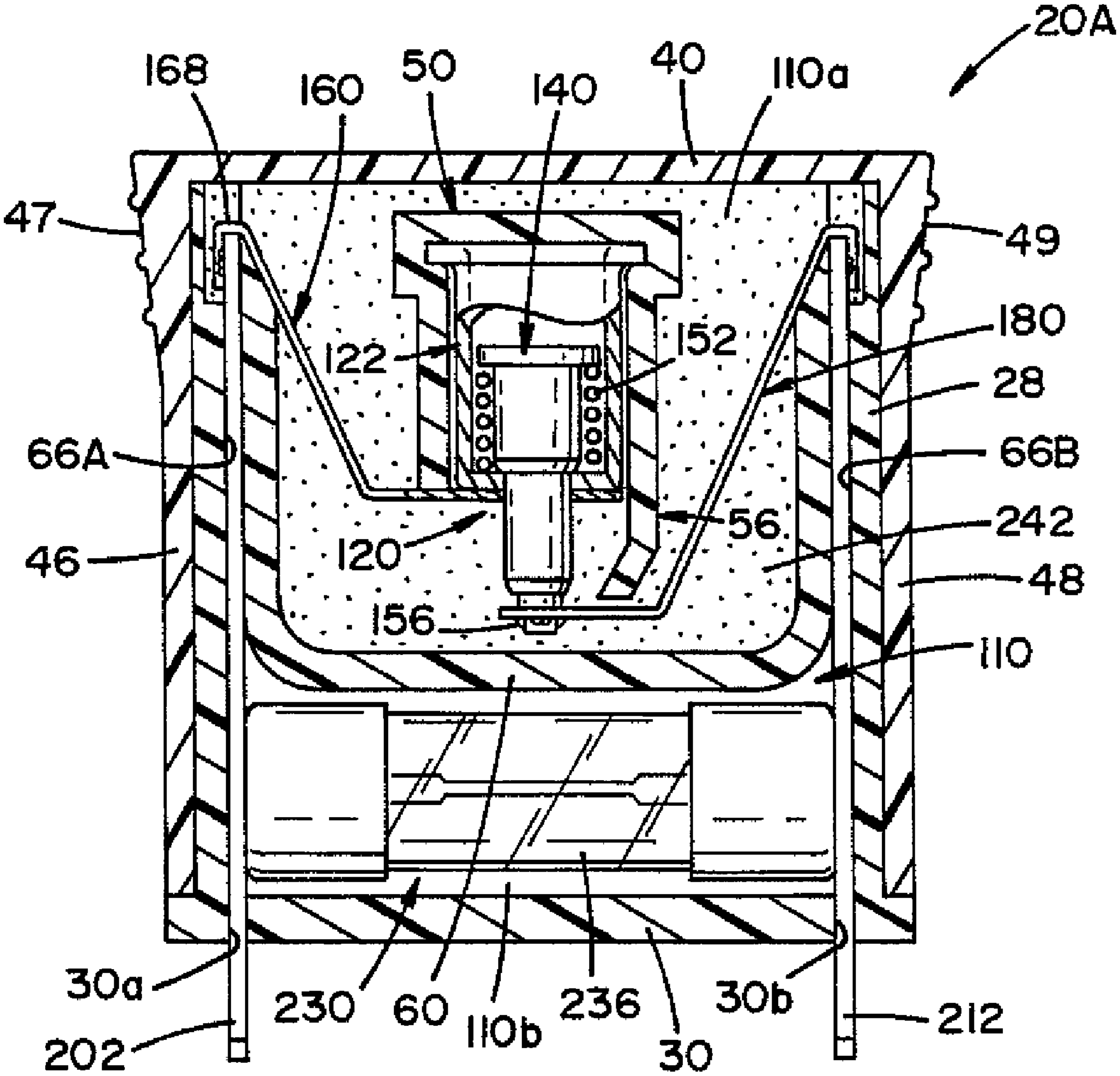
FIG. 7 is a cross-sectional view of a circuit protection device having a bypass shunt according to an alternative embodiment.

Referring now to FIG. 7, there is shown an embodiment of the circuit protection device having a bypass shunt according to an alternative embodiment. Circuit protection device 20A is essentially comprised of the same basic components as circuit protection device 20 described above. However, a fuse element 236 is substituted for coiled wire 232 of bypass shunt 230. Like components of circuit protection devices 20 and 20A have the same reference numbers. In this embodiment, arc-quenching media 244 is not required in lower region 110*b*.

In the illustrated embodiment, fuse element 236 takes the form of a conventional ferrule-type cartridge fuse mounted in a fuseholder (not shown). The fuseholder may include a pair of fuse clips (not shown) to respectively attach the terminals of fuse element 236 to first and second electrodes 200, 210. Examples of suitable ferrule-type cartridge fuses, include, but are not limited to, fuses having a current rating in the range of about 5 A to about 15 A, and a voltage rating in the range of about 300V to about 1000V.

Operation of circuit protection device 20 will now be described with particular reference to FIGS. 1, 3 and 6. It should be appreciated that circuit protection device 20A operates substantially the same as circuit protection device 20, and therefore will not be separately described. Housing 22 of circuit protection device 20 is inserted into opening 94 of holder 70 such that blade terminals 202, 212 of first and second electrodes 200, 210 are respectively inserted through slots 92*a* and 92*b* of holder 70 (FIG. 1). Blade terminals 202, 212 of first and second electrodes 200, 210 are electrically connected with an electrical circuit via fuse clips of a terminal connector (not shown) located inside the internal cavity of holder 70. First electrode 200 is electrically connected with a first line of an electrical circuit via the terminal connector, while second electrode 210 is electrically connected with a second line of the electrical circuit via the terminal connector. The first and second lines of the electrical circuits may respectively be a ground or neutral line and a power line, or vice versa.

When overload assembly 120 is in the closed position, as shown in FIGS. 3 and 4, a first conductive path is provided between first electrode 200 and second electrode 210, i.e., through first thermal element 160, cup 122, biasing element 152, pin 140 and second thermal element 180. Bypass shunt 230 provides a second conductive path between first electrode 200 and second electrode 210 that is parallel to the first conductive path. Leg section 56 of enclosure 50 acts as a shield to prevent a short circuit between end portion 162 of first thermal element 160 and intermediate portion 186 of second thermal element 180.

When an overcurrent condition occurs (i.e., the current rating of circuit protection device 20 is exceeded), the temperature of first and second thermal elements 160, 180 will increase, thereby causing solder 156 to soften and melt as the temperature of solder 156 increases beyond its melt temperature. Consequently, pin 140 separates from second thermal element 180, thereby terminating the electrical connection between overload assembly 120 and second thermal element 180. In this respect, overload assembly 120 moves from a closed position (FIG. 3) to an open position (i.e., an overload condition), as biasing element 152 forces pin 140 to move away from second thermal element 180, as shown in FIG. 6. As a result, the conductive path across first and second thermal elements 160 and 180 opens. In one embodiment of the present invention, the current rating of circuit protection device 20 is in the range of about 8 A to about 60 A.

Figure 6:
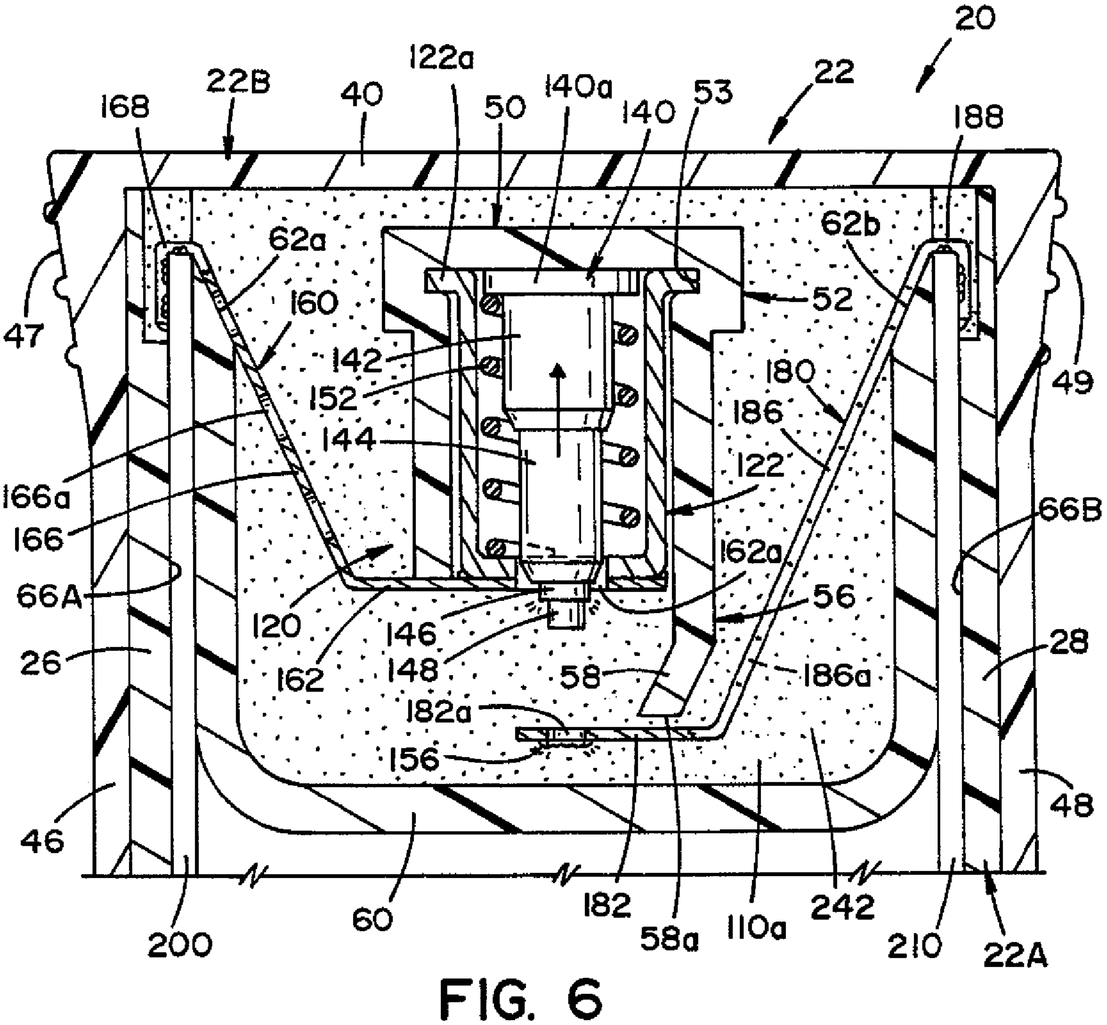
FIG. 6 is an enlarged cross-sectional view of an upper region of the circuit protection device of FIG. 1, the overload assembly shown in an open circuit position (i.e., overload condition)

In response to overload assembly 120 moving to the open position (i.e., opening the first conductive path between first and second electrodes 200, 210), as shown in FIG. 6, the conductive path is shunted by bypass shunt 230. Therefore, residual follow-on current flows through bypass shunt 230 when overload assembly 120 moves to the open position. Conduction of the current continues through bypass shunt 230 until bypass shunt 230 melts (i.e., blows), thereby opening the second conductive path between first and second electrodes 200, 210. Electrical arcing is contained within bypass shunt 230, until extinguished by the arc-quenching media 244. After bypass shunt 230 has "melted," the second conductive path between first and second electrodes 200, 210 remains permanently open. Bypass shunt 230 prevents arcing with respect to first and second thermal elements 160, 180, and reduces power loss.

Figure 8:
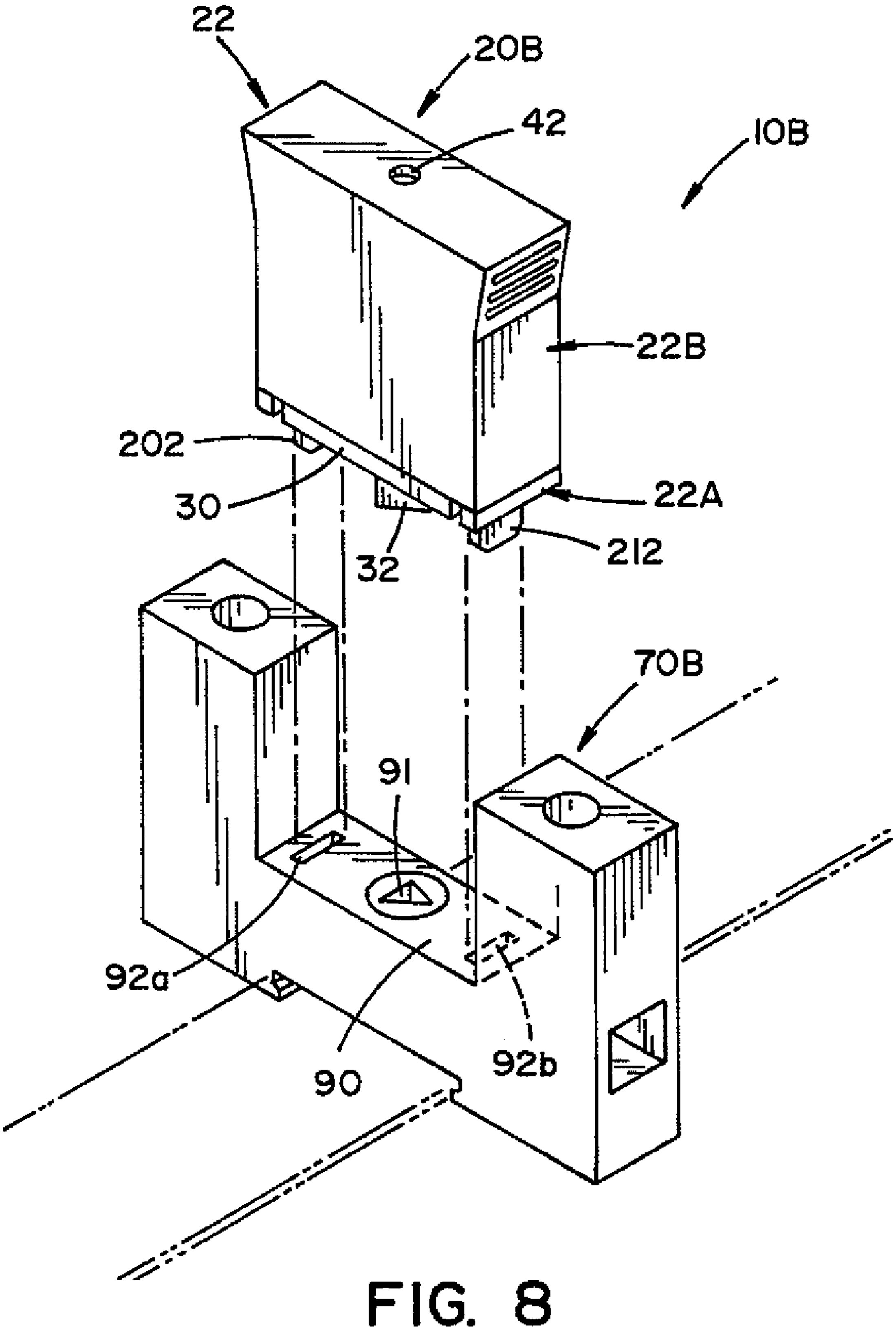
FIG. 8 is an exploded perspective view of an assembly including a circuit protection device and a holder, according to a second embodiment of the present invention.
Figure 9:
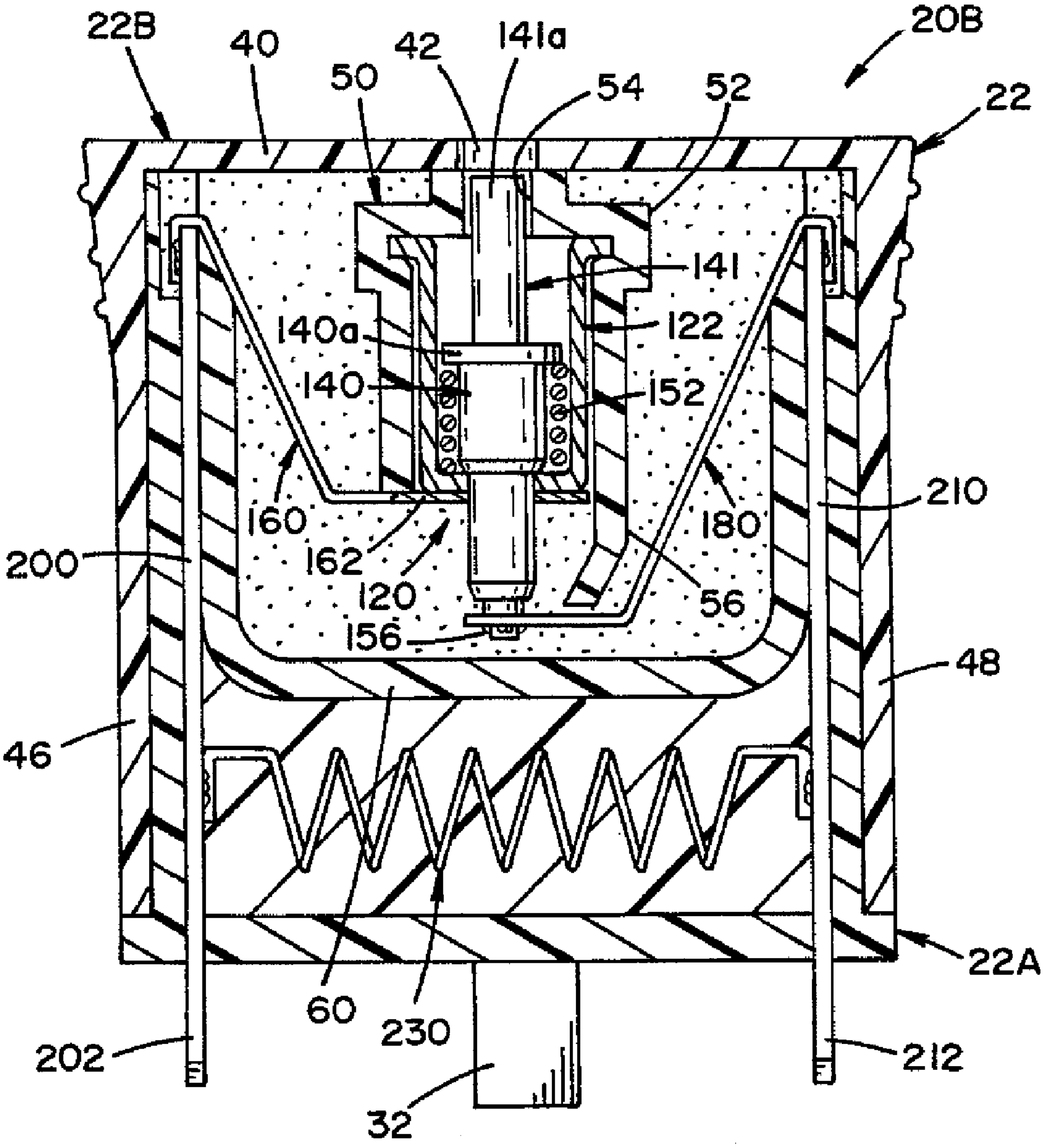
FIG. 9 is a cross-sectional view of the circuit protection device of FIG. 8 according to the second embodiment of the present invention, wherein the overload assembly is shown in a closed circuit position.
Figure 10:
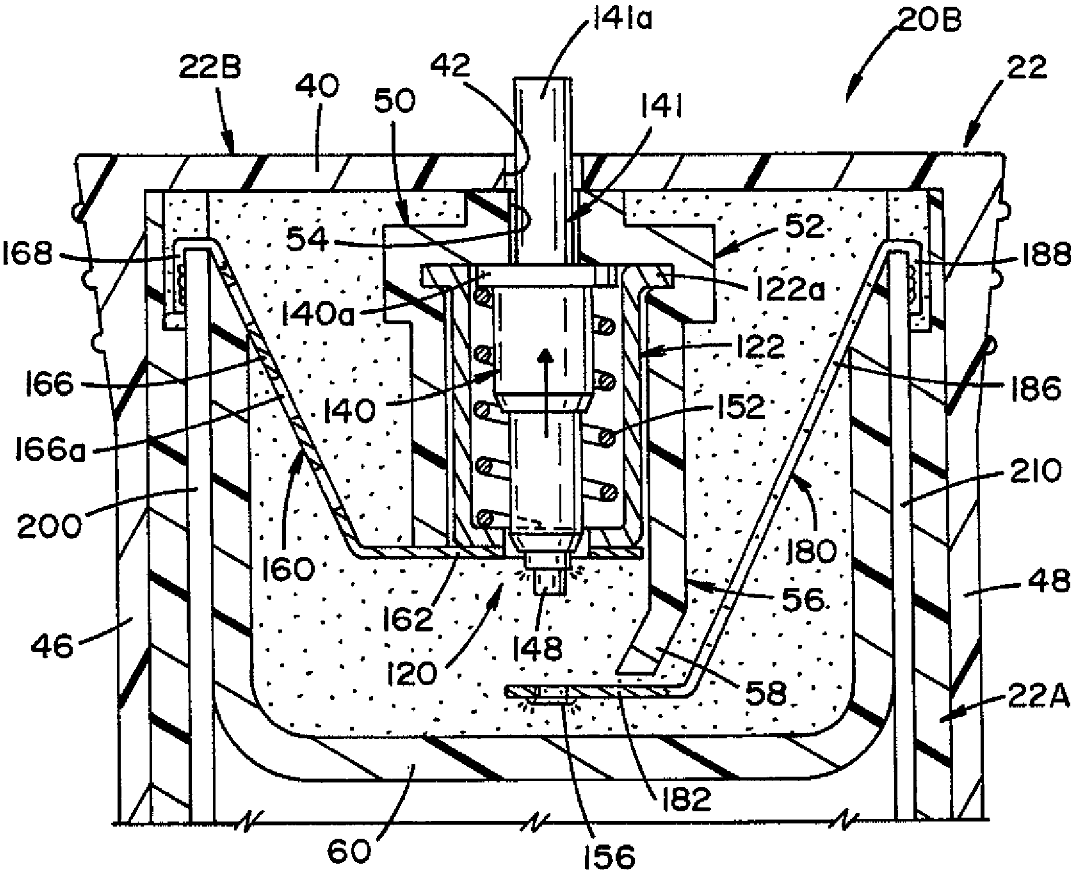
FIG. 10 is an enlarged cross-sectional view of an upper region of the circuit protection device of FIG. 8 according to the second embodiment of the present invention, wherein the overload assembly is shown in an open circuit position.

Referring now to FIGS. 8-10, there is shown a fuse assembly 10B according to a second embodiment of the present invention. Fuse Assembly 10B includes a circuit protection device 20B and a fuse mount or holder 70B. Circuit protection device 20B and holder 70B are substantially similar to circuit protection device 20 and holder 70, and therefore like components have been identified with the same reference numbers in the drawings. The components of circuit protection device 20B and holder 70B that differ from circuit protection device 20 and holder 70 will now be described in detail.

With reference to FIG. 8, circuit protection device 20B includes a protuberance 32 extending outward from bottom wall 30 of base section 22A of housing 22. Protuberance 32 is dimensioned to be received in a recess 91 formed in center wall portion 90 of holder 70B. In the illustrated embodiment, protuberance 32 and recess 91 have a triangular-shaped configuration that allows first and second blade terminals 202, 212 of circuit protection device 20B to be inserted into slots 92*a*, 92*b* of holder 70B in only one orientation. Accordingly, improper electrical connection to the terminal connectors within the internal cavity of holder 70B is prevented. Moreover, protuberance 32 and recess 91 can be configured with different shapes and/or dimensions to discriminate between circuit protection devices of various voltage ratings. It is contemplated that the locations of the protuberance and mating recess may be reversed, wherein protuberance 32 may be formed on center wall portion 90, and recess 91 may be formed in bottom wall 30.

Circuit protection device 20B also includes an indicator element 141 that protrudes through a hole 42 formed in top wall 40 of cover section 22B when an overload condition has occurred, as will now be explained with reference to FIGS. 9 and 10. Enclosure 50 of circuit protection device 20B includes a channel 54 formed in upper section 52. Channel 54 is dimensioned to receive an indicator element 141 which extends from flange portion 140*a* of pin 140. In the illustrated embodiment, indicator element 141 takes the form of a cylindrical post.

As illustrated in FIG. 9, indicator element 141 is located within housing 22 when overload assembly 120 is in the closed position. When an overload condition occurs, and overload assembly 120 moves to the open position, and end section 141*a* of indicator element 141 moves through hole 42 in top wall 40, as biasing element 152 forces pin 140 to move away from second thermal element 180. Consequently, end section 141*a* of indicator element 141 protrudes from housing 22 to provide an external visual indication of an overload condition.

It is contemplated that circuit protection device 20B may be alternatively configured with bypass shunt 230, as provided in the embodiment shown in FIG. 7.

The advantages of the circuit protection device described above, include low watt loss (i.e., higher efficiency), a plug-type replacement that does not require removal of wiring, and a small footprint that can be used in multiple poles. The circuit protection device of the present invention has relatively low watt losses when compared to conventional existing fuses that have either a single punched strip or wire element. Overload assembly 120 and thermal elements 160, 180 contribute significantly to the reduction of power loss, because they operate efficiently and reliably during overload conditions, but have a relatively low maximum interrupting capability.

The foregoing describes preferred embodiments of the present invention. It should be appreciated that these embodiments are described for purposes of illustration only, and that numerous alterations and modifications may be practiced by those skilled in the art without departing from the spirit and scope of the invention. For example, although the present invention has been described with reference to use with photovoltaic systems, it is contemplated that the present invention may find utility in connection with other types of electrical systems. It is intended that all such modifications and alterations be included insofar as they come within the scope of the invention as claimed or the equivalents thereof.

Having described the invention, the following is claimed:

1. A circuit protection device for protecting an electrical circuit from an overcurrent condition, said circuit protection device comprised of:

a first electrode electrically connectable to a first line of the electrical circuit;

a second electrode electrically connectable to a second line of the electrical circuit;

a first thermal element electrically connected with the first electrode;

a second thermal element electrically connected with the second electrode;

an overload assembly electrically connecting the first thermal element with the second thermal element, said overload assembly moveable between an open position and a closed position, wherein said first thermal element, said second thermal element and said overload assembly define a first conductive path between the first and second electrodes;

a low melt temperature solder electrically connecting the overload assembly to the second thermal element, wherein said low melt temperature solder softens and melts as the temperature increases in response to an overcurrent condition;

a bypass shunt electrically connected with the first and second electrodes, wherein the bypass shunt defines a second conductive path between the first and second electrodes, said second conductive path parallel to the first conductive path.

2. A circuit protection device according to claim 1, wherein said overload assembly moves to the open position when the low melt temperature softens and melts in response to an overcurrent condition, thereby opening the first conductive path.

3. A circuit protection device according to claim 1, wherein when the current rating of said circuit protection device is exceeded, the low melt temperature solder is heated beyond its melt temperature, thereby causing said overload assembly to move to the open position to open the first electrical current path between the first and second electrodes.

4. A circuit protection device according to claim 1, wherein said low melt temperature solder has a melting temperature in the range of about 134° C. to about 145° C.

5. A circuit protection device according to claim 1, wherein the device further comprises a housing, wherein said first and thermal elements, said overload assembly, and said bypass shunt are disposed in said housing.

6. A circuit protection device according to claim 1, wherein said second electrical current path parallel to said first electrical current path is opened when the bypass shunt melts.

7. A circuit protection device according to claim 1, wherein said bypass shunt has a current rating in the range of about 10 A to about 15 A amps.

8. A circuit protection device according to claim 1, wherein said first electrode is a electrically connected to a first line of said electrical circuit, and said second electrode is electrically connected to a second line of said electrical circuit.

9. A circuit protection device according to claim 1, wherein said overload assembly includes a pin for electrically connecting the first thermal element with the second thermal element, wherein said pin is biased away from the second thermal element by a biasing element.

10. A circuit protection device according to claim 9, wherein said biasing element is a spring.

11. A circuit protection device according to claim 9, wherein said overload assembly includes a metal cup dimensioned to receive the pin and biasing element.

12. A circuit protection device according to claim 11, wherein said metal cup is electrically connected to the first thermal element.

13. A circuit protection device according to claim 1, wherein said bypass shunt is a coiled wire.

14. A circuit protection device according to claim 1, wherein said bypass shunt is a cartridge FUSE mounted in a fuseholder that electrically connects the cartridge fuse to the first and second electrodes.

15. A circuit protection device according to claim 1, wherein said first thermal element includes at least one hole for forming an open circuit.

16. A circuit protection device according to claim 1, wherein said second thermal element includes at least one hole for forming an open circuit.

17. A circuit protection device according to claim 1, wherein said circuit protection device further comprises an arc-quenching media.

18. A circuit protection device according to claim 17, wherein said arc-quenching media surrounds said first and second thermal elements.

19. A circuit protection device according to claim 17, wherein said arc-quenching media surrounds said bypass shunt.

20. A circuit protection device according to claim 1, wherein said circuit protection device is dimensioned to be received by a holder.

21. A circuit protection device according to claim 1, wherein said device further comprises an indicator element for providing a visual indication of an overload condition.

* * * * *